March 3, 1964  D. B. PALL  3,122,924

MANOMETER

Filed May 23, 1962

3,122,924
MANOMETER

David B. Pall, Roslyn Estates, N.Y., assignor to Pall Corporation, Glen Cove, N.Y., a corporation of New York
Filed May 23, 1962, Ser. No. 197,163
8 Claims. (Cl. 73—401)

This invention relates to devices such as fluid manometers, measuring gas pressure against the weight of a column of fluid and more particularly to such devices incorporating means for preventing loss of fluid therefrom due to temporary overpressure.

A manometer balances a column of fluid between two gas systems, or between two parts of the same system. Any change in gas pressure on one side of the column, related to the other, results in a shift or displacement of the column, and this displacement is a function of the density of the fluid and of the magnitude of the pressure differential. Hence, knowledge of the column density and height and of the pressure on one side make it possible to calculate the pressure on the other side from the rise or fall in the level of the fluid within the manometer tube. In order to permit an accurate change in level of the fluid with change in pressure, the tube in which the column moves must permit free movement of the fluid within the length required between the normal pressure limits, and must be open to free passage of gas at both sides of the fluid column. This of course means that when a sudden overpressure beyond the normal limits is experienced, manometer fluid is forced from the tube.

This is a particularly serious problem in the case of mercury manometers, and consequently a variety of methods have been employed to prevent this. For the most part, these methods have used a mercury-impervious, air-permeable plug attached to the end of the manometer tube from which mercury would be forced out by overpressure. Representative are U.S. Patents No. 998,916, which uses unglazed porcelain, No. 1,594,039, which uses a plug made of porous silica, and No. 2,228,023 which uses "barometer kid." These plugs are designed to prevent any loss of mercury from the tube. A sudden excessively high overpressure will therefore either cause the mercury to blow the plug out of the tube, or break the tube itself.

The present invention provides a manometer tube having a porous disc of special design at the end or ends at which the loss of manometer fluid is to be prevented. The disc is not wetted by the manometer fluid, is freely gas-permeable, and permits passage of manometer fluid only at pressures beyond a predetermined minimum. The disc can be used with any type of manometer fluid, and is particularly desirable for use with water manometers.

The predetermined minimum pressure at which fluid flow begins is selected according to the system, so that the fluid is retained at all normal pressure differentials. This pressure is a function of the viscosity of the fluid, and the porosity of the disc, and the latter in turn is a function of the thickness, pore size, pore area, and the material of which the disc is made. These principles are well known in the filter art, and are readily applicable to calculate the physical dimensions required in a disc to meet the limitation on a minimum pressure for any given system.

It is essential that the disc material not be wetted by the manometer liquid. Each time the disc passes fluid, the fluid must not be retained by the disc, since it would then plug the disc to a greater or lesser extent, and the manometer would then give a false reading. A disc wetted by the liquid would retain it, like a sponge, and hence is inoperative. On the other hand, the liquid drains fully from a disc not wetted thereby, as soon as the overpressure is corrected, and the fluid draws away from the disc.

The disc accordingly operates as a pressure release. At differential pressures up to the predetermined minimum pressure, the disc will retain the manometer fluid. At pressures above the minimum the disc permits flow through and escape of the manometer fluid at a rate high enough to prevent damage to the manometer. Moreover, the disc does not obstruct flow of gas, so that accurate pressure readings are obtained.

The invention also provides a means for collecting and either discharging or returning to the manometer any fluid which escapes through the disc. In this way, the fluid is not wasted, an important consideration in the case of mercury.

A preferred means for discharging manometer fluid from the system comprises an ejection chamber having at an outlet therefrom a second porous disc made of a material which is wetted by the manometer fluid. Such a disc tends to retain the fluid, and hence is nonpervious to gases, acting as a plug at all pressures up to the bubble point of the disc (U.S. Patent No. 3,007,334). Hence, the plug retains any gas on that side of the manometer within the system. Whenever fluid is ejected from the manometer and enters the ejection chamber, it flows to the disc, and passes freely through it, due to the fact that it wets the disc, thus being discharged from the system without releasing any gas therefrom.

The porous discs made of non-wetted and of wetted material can be fabricated in any manner, to the required porosity. Thickness is not critical, and is adjusted with pore dimensions and pore area to obtain this porosity. Sintered materials, such as sintered glass, sintered polyvinyl chloride, sintered nylon, sintered polytetrafluoroethylene, and sintered stainless steel, can be used.

Impregnated porous base materials also can be used, such as sintered stainless steel whose porosity is further reduced by impregnation with powdered stainless steel or resins. A particularly useful material of this type is paper having relatively large pores within which is deposited particulate material in an amount to diminish the diameter thereof to less than 25 microns over at least a portion of their length between the surfaces of the material. The particulate material, which can be in the form, for example, of fibers or granules, and which is of a size small enough to enter the pores in the porous material to be impregnated, is suspended in a fluid and deposited therefrom within the pores and, if desired, upon the surface of the porous material. The particulate material can all be of the same size, or of two or more sizes, all suspended in the fluid system. The desired reduction in pore diameter of the base is obtained by varying the size and amount of the particulate material deposited in the pores from surface to surface of the material, blending different sizes at different points, if desired. The particles can be deposited in any amount at any point in or throughout the pore, so that a porous material can be obtained in which the pores are filled in from surface to surface or only at one side or in the center of the material, as desired. Most porous materials have nonuniform pores, and advantage is taken of this nonuniformity in establishing the type, extent and location of the deposition therein that is desired.

Any porous material whose pores extend from surface to surface can be impregnated. One or several layers of the same or varying porosity can be employed. Exemplary bases are paper, porous foams of metals and of natural or synthetic plastic materials, such as aluminum, and synthetic resins and cellulose derivatives, in the form of spongy layers of any desired thickness, depending upon whether a surface-type or depth-type filter is required, such as polyurethane (see Patent No. 2,961,710), polyvinyl chloride, polyethylene and polypropylene sponges and foams, textile fabrics and nonwoven fibrous layers of all kinds, such as, felts, mats and bats, made of fibrous materials of any of the types listed below in connection with the particulate material. The characteristics of the pores thereof depend not only on the choice and amount of the materials deposited therein, but also on the base or substratum within which, and also, if desired, on which, the particulate materials are deposited.

Fibrous material is preferred, because of its versatility, and because of the greater ease of deposition within the pores. A great variety of diameters of fibers are available, thus making it possible to achieve a very large assortment of mixtures of different diameter fibers for making fibrous material of any porosity, and such fibers can be made of any length, so as to take advantage of the greater cohesiveness of a layer of long fibers, as compared to granular material layers. Typical fibrous materials include glass, asbestos, potassium titanate, aluminum silicate, mineral wool, regenerated cellulose, polystyrene, polyvinyl chloride, polyvinylidene chloride, polyacrylonitrile, polyethylene, polypropylene, rubber, polymers of terephthalic acid and ethylene glycol, polyamides, casein fibers, zein fibers, cellulose acetate, viscose rayon, hemp, jute, linen, cotton, silk, wool, mohair, paper, and metallic fibers such as iron, copper, aluminum, stainless steel, brass, monel, silver, and titanium.

Nonfibrous particulate materials can also be used, but with greater difficulty. The principle of the invention requires that the particle be small enough to enter the pore in which it is deposited, and then be deposited therein. This is more difficult to do with particles than with fibers, and frequently is impossible unless a proportion of fibers is mixed in. Therefore, when particles are used, it is preferred to admix therewith at least 5% and preferably at least 25% of fibrous material.

Typical particulate materials are diatomaceous earth, Fuller's earth, silicon, magnesia, silica, talc, silica gel, alumina, quartz, carbon, activated carbon, clays, synthetic resins and cellulose derivatives, such as polyethylene, polyvinyl chloride, polystyrene, polypropylene, urea-formaldehyde, phenol-formaldehyde, polytetrafluoroethylene, polytrifluorochloroethylene, polymers of terephthalic acid and ethylene glycol, polyacrylonitrile, ethyl cellulose, polyamides, and cellulose acetate-propionate, and metal particles such as aluminum, silver, platinum, iron, copper, nickel, chromium and titanium and metal alloys of all kinds, such as monel, brass, stainless steel, bronze, Inconel, cupronickel, Hastalloy, beryllium, and copper. The combinations of diatomaceous earth and glass fibers are preferred.

The porous discs of this invention can be attached to or integral with the manometer, or can be fitted to a separate unit attached to the manometer.

Further details on the apparatus of this invention can be had from the drawings, in which.

Figure 1:
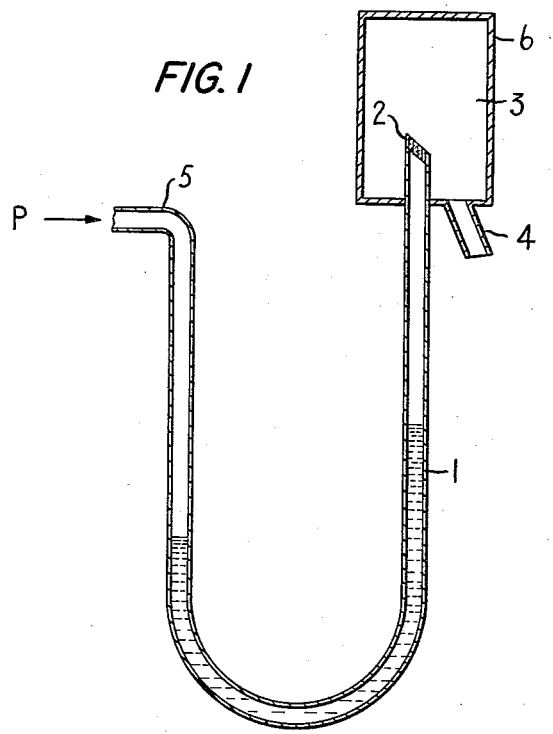
FIGURE 1 represents a typical U-tube manometer containing a porous disc of this invention.

The manometer of FIGURE 1 comprises a U-shaped manometer tube 1 incorporating at the right top end thereof a porous disc 2 made of a material which is not wetted by the manometer fluid. The disc is inclined at an angle to facilitate draining of fluid therefrom. The disc is integral with the tube, but it can also be bonded thereto, as desired. Surrounding that end of the tube is a container 6 containing an ejection chamber 3, open to the atmosphere via drain tube 4, which directs the discharge flow of ejected fluid to any desired point. The other end 5 of the tube is open to the gas pressure to be measured against the atmospheric pressure, which pressure can be below or above atmospheric. The fluid 1 in the tube assumes a level in the two arms of the U corresponding to the pressure differential across the tube.

The porous disc 2 is freely gas permeable, but will not pass manometer fluid at pressure differentials less than a predetermined minimum. The disc is of material not wetted by the manometer fluid, such as porcelain, when the fluid is water, or glass, when the fluid is mercury. Asbestos fiber-impregnated paper is also useful with water. The disc material is of any porosity, selected so that the fluid passes through only at differential pressures above 5, 10, 25, 50, 75 or 100 p.s.i., depending upon the normal range of pressure differential within which the system is operated.

In operation, the manometer fluid is retained by the porous disc at all normal pressure differentials. Whenever a temporary increase in the pressure differential beyond this predetermined range occurs, the manometer fluid rises to the disc, and flows through it, until either the over-pressure is corrected or all the fluid is discharged. The fluid escaping from the tube enters the chamber 3, and is discharged therefrom via outlet 4. Subsequently the fluid can be returned to the manometer tube, either automatically or manually. In this manner, overpressure can be relieved without damage to the tube.

Figure 2:
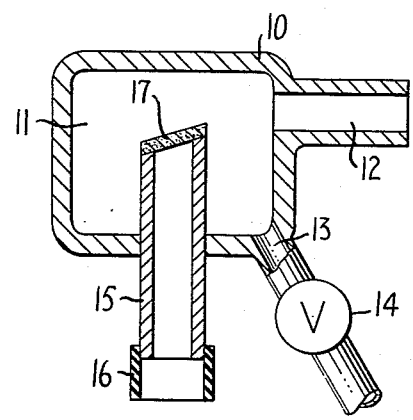
FIGURE 2 represents a pressure-relieveing device incorporating a porous disc, for attachment to a manometer tube.

The device of FIGURE 2 is intended for attachment to a manometer as shown in FIGURE 1, and includes a drain valve for retention of gas pressure at the fluid collection side of the manometer. The device includes a housing 10 comprising an ejection chamber 11 having a pressure connection 12 and an outlet 13 equipped with a drain valve 14, operated by hand. A manometer connection 15 permits attachment to the end of a manometer tube, via the rubber sleeve 16, which fits tightly over the tube end to prevent leakage. At the top of the connection is a porous disc 17 of non-wetted material, as heretofore described.

The disc is preferably inclined at an angle as indicated so that any fluid which is forced through, due to a high pressure differential, rolls off the top surface and collects at the bottom of the chamber 16. The walls of housing 10 are, preferably, transparent in at least one portion, to permit observation of fluid level.

In operation, fluid ejected through disc 17 due to overpressure is collected in chamber 11. Whenever necessary, valve 14 is opened to discharge the fluid collected, which can then be returned to the manometer either automatically or manually.

Figure 3:
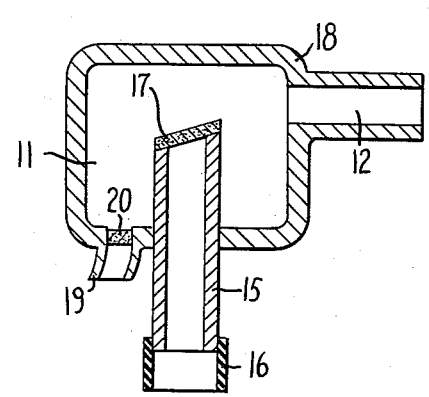
FIGURE 3 represents another embodiment of the device of FIGURE 2, containing an outlet port incorporating a second porous disc wetted by the manometer fluid, for discharge thereof without escape of gas from the system.

FIGURE 3 illustrates a modification of the device of FIGURE 2, adapted for free discharge of fluid from the chamber 11. The housing 18 in this case has an outlet port 19 provided with a porous disc 20 made of a material which is wetted by the manometer fluid. Hence, it retains such fluid, and does not pass gas at pressures below the bubble point. In the case of water, to prevent evaporation of the water retained therein, a suitable humectant such as glycerine can be added.

In operation, fluid ejected from the manometer tube is collected in chamber 11, where it flows to disc 20. Since it wets the disc, it is quickly absorbed thereby, and a corresponding amount of fluid is discharged from the other side of the disc, effectively draining off all the fluid in the chamber 11 without permitting gas to escape therefrom.

I claim:

1. A device for preventing loss of fluid from a manometer tube except at pressure differentials above a predetermined minimum, comprising a porous gas-permeable disc of a material not wetted by manometer fluid and resisting passage therethrough of manometer fluid at pressure differentials below a predetermined minimum; and a receiver communicating with said disc for collecting manometer fluid passed through said disc.

2. A device as in claim 1 wherein said receiver is provided with a valved outlet for maintaining system pressure.

3. A device as in claim 2 wherein said valve comprises a porous disc of material which is wetted by the manometer fluid.

4. A device as in claim 1 wherein the disc comprises a porous material having ultrafine pores, substantially all of which are less than 25 microns in diameter.

5. A manometer capable of withstanding the application of unusual differential pressures comprising a manometer tube having two open ends, each in communication with a pressure source, a porous disc disposed across the tube adjacent at least one open end, said disc being of a material not wetted by the manometer fluid, and resisting passage therethrough of manometer fluid at pressures below a predetermined minimum, and a receiver communicating with the other side of said disc for collecting manometer fluid passing through said disc.

6. A manometer as in claim 5 wherein said receiver is provided with a means for withdrawing manometer fluid.

7. A manometer as in claim 6 wherein the means for withdrawing manometer fluid comprises an outlet fitted with a porous disc of a material wetted by the manometer fluid.

8. A manometer as in claim 5 adapted to employ water as the manometer fluid.

References Cited in the file of this patent

UNITED STATES PATENTS

| | | |
|---|---|---|
| 1,394,031 | Lundin | Oct. 18, 1921 |
| 1,419,388 | King | June 13, 1922 |
| 1,642,615 | Lommel | Sept. 13, 1927 |